United States Patent
Koyama et al.

(10) Patent No.: US 9,451,246 B2
(45) Date of Patent: Sep. 20, 2016

(54) DISPLAY DEVICE

(75) Inventors: Jun Koyama, Sagamihara (JP); Hiroyuki Miyake, Atsugi (JP); Hideaki Shishido, Atsugi (JP); Seiko Inoue, Isehara (JP); Kouhei Toyotaka, Atsugi (JP); Koji Kusunoki, Kawasaki (JP); Hikaru Harada, Isehara (JP); Makoto Kaneyasu, Hadano (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 381 days.

(21) Appl. No.: 13/545,768

(22) Filed: Jul. 10, 2012

(65) Prior Publication Data

US 2013/0021239 A1  Jan. 24, 2013

(30) Foreign Application Priority Data

Jul. 19, 2011  (JP) ................. 2011-157990

(51) Int. Cl.
*G09G 5/00* (2006.01)
*H04N 13/04* (2006.01)

(52) U.S. Cl.
CPC ...... *H04N 13/0477* (2013.01); *H04N 13/0413* (2013.01); *H04N 13/0422* (2013.01); *H04N 13/0452* (2013.01); *H04N 13/0475* (2013.01)

(58) Field of Classification Search
None
See application file for complete search history.

(56) References Cited

U.S. PATENT DOCUMENTS

| | | | |
|---|---|---|---|
| 2,883,906 A | 4/1959 | Rehorn | |
| 3,191,493 A | 6/1965 | Mainardi et al. | |
| 3,586,592 A | 6/1971 | Cahn | |
| 4,329,019 A | 5/1982 | Okoshi et al. | |
| 4,872,750 A | 10/1989 | Morishita | |
| 4,945,407 A | 7/1990 | Winnek | |
| 4,957,351 A | 9/1990 | Shioji | |
| 4,959,641 A | 9/1990 | Bass et al. | |
| 5,113,285 A | 5/1992 | Franklin et al. | |

(Continued)

FOREIGN PATENT DOCUMENTS

| CN | 101938666 | 1/2011 |
|---|---|---|
| EP | 1489858 A | 12/2004 |

(Continued)

OTHER PUBLICATIONS

Ives.H, "The Chromolinoscope Revived," J.O.S.A., Jun. 1, 1930, pp. 343-353.

(Continued)

*Primary Examiner* — Amr Awad
*Assistant Examiner* — Andre Matthews
(74) *Attorney, Agent, or Firm* — Robinson Intellectual Property Law Office; Eric J. Robinson

(57) ABSTRACT

A display device includes a display panel including a plurality of pixels, a shutter panel including a driver circuit, a liquid crystal, and light-transmitting electrodes provided in a striped manner, and a positional data detector configured to detect a positional data of a viewer. The shutter panel is provided over a display surface side of the display panel, a width of one of the light-transmitting electrodes in the shutter panel is smaller than that of one of the plurality of pixels, and the driver circuit in the shutter panel is configured to selectively output signals for forming a parallax barrier to the light-transmitting electrodes. The parallax barrier is capable of changing its shape in accordance with the detected positional data.

12 Claims, 12 Drawing Sheets

(56) References Cited

U.S. PATENT DOCUMENTS

| | | | |
|---|---|---|---|
| 5,132,820 A | 7/1992 | Someya et al. | |
| 5,132,839 A | 7/1992 | Travis | |
| 5,162,897 A | 11/1992 | Jitsukata et al. | |
| 5,239,372 A | 8/1993 | Lipton | |
| 5,315,377 A | 5/1994 | Isono et al. | |
| 5,410,345 A | 4/1995 | Eichenlaub | |
| 5,465,175 A | 11/1995 | Woodgate et al. | |
| 5,493,427 A | 2/1996 | Nomura et al. | |
| 5,541,642 A | 7/1996 | Ashbey | |
| 5,563,621 A | 10/1996 | Silsby | |
| 5,602,658 A | 2/1997 | Ezra et al. | |
| 5,640,273 A | 6/1997 | Hamagishi et al. | |
| 5,663,831 A | 9/1997 | Mashitani et al. | |
| 5,666,226 A | 9/1997 | Ezra et al. | |
| 5,777,700 A | 7/1998 | Kaneko et al. | |
| 5,880,704 A | 3/1999 | Takezaki | |
| 5,883,739 A | 3/1999 | Ashihara et al. | |
| 5,917,562 A | 6/1999 | Woodgate et al. | |
| 5,959,664 A | 9/1999 | Woodgate | |
| 6,014,164 A * | 1/2000 | Woodgate et al. | 348/51 |
| 6,049,424 A | 4/2000 | Hamagishi | |
| 6,118,584 A | 9/2000 | Van et al. | |
| 6,188,518 B1 | 2/2001 | Martin | |
| 6,317,175 B1 | 11/2001 | Salerno et al. | |
| 6,377,230 B1 | 4/2002 | Yamazaki et al. | |
| 6,597,348 B1 | 7/2003 | Yamazaki et al. | |
| 6,882,012 B2 | 4/2005 | Yamazaki et al. | |
| 7,066,599 B2 | 6/2006 | Hattori et al. | |
| 7,145,536 B1 | 12/2006 | Yamazaki et al. | |
| 7,193,593 B2 | 3/2007 | Koyama et al. | |
| 7,224,339 B2 | 5/2007 | Koyama et al. | |
| 7,268,756 B2 | 9/2007 | Koyama et al. | |
| 7,317,438 B2 | 1/2008 | Yamazaki et al. | |
| 7,385,579 B2 | 6/2008 | Satake | |
| 7,425,937 B2 | 9/2008 | Inukai | |
| 7,791,571 B2 | 9/2010 | Ohtani et al. | |
| 2005/0012097 A1 | 1/2005 | Yamazaki | |
| 2007/0279319 A1 | 12/2007 | Yamazaki et al. | |
| 2007/0279359 A1 | 12/2007 | Yoshida et al. | |
| 2007/0279374 A1 | 12/2007 | Kimura et al. | |
| 2007/0288194 A1* | 12/2007 | Boillot | 702/150 |
| 2009/0303219 A1* | 12/2009 | Kimura | G09G 3/3688 345/211 |
| 2009/0321737 A1 | 12/2009 | Isa et al. | |
| 2010/0060658 A1* | 3/2010 | Fujii et al. | 345/589 |
| 2010/0148177 A1 | 6/2010 | Koyama et al. | |
| 2010/0182282 A1 | 7/2010 | Kurokawa et al. | |
| 2010/0231769 A1* | 9/2010 | Shizukuishi | H01L 27/14603 348/306 |
| 2010/0277434 A1* | 11/2010 | Chang et al. | 345/174 |
| 2010/0328438 A1 | 12/2010 | Ohyama et al. | |
| 2011/0122329 A1 | 5/2011 | Broughton et al. | |
| 2011/0157696 A1* | 6/2011 | Bennett et al. | 359/462 |
| 2011/0234582 A1 | 9/2011 | Daiku et al. | |
| 2011/0242100 A1 | 10/2011 | Yamazaki et al. | |
| 2012/0208637 A1 | 8/2012 | Hirakata | |
| 2012/0229431 A1 | 9/2012 | Hiroki | |

FOREIGN PATENT DOCUMENTS

| | | |
|---|---|---|
| JP | 08-036145 A | 2/1996 |
| JP | 2003-259395 A | 9/2003 |
| JP | 2004-294914 A | 10/2004 |
| JP | 2005-010303 A | 1/2005 |
| JP | 2005-045323 A | 2/2005 |
| JP | 2005-258013 A | 9/2005 |
| JP | 2008-058602 A | 3/2008 |
| JP | 2010-073881 A | 4/2010 |
| JP | 2010-128306 A | 6/2010 |
| JP | 2010-251156 A | 11/2010 |
| JP | 2011-013778 A | 1/2011 |

OTHER PUBLICATIONS

Sheat.D et al., "3-D Imaging Systems for Telecommunications Applications," Proceedings of SPIE, 1992, vol. 1669, pp. 186-192.

Sexton.I, "Parallax Barrier Display Systems," Oct. 1, 1992, 5 pages.

* cited by examiner

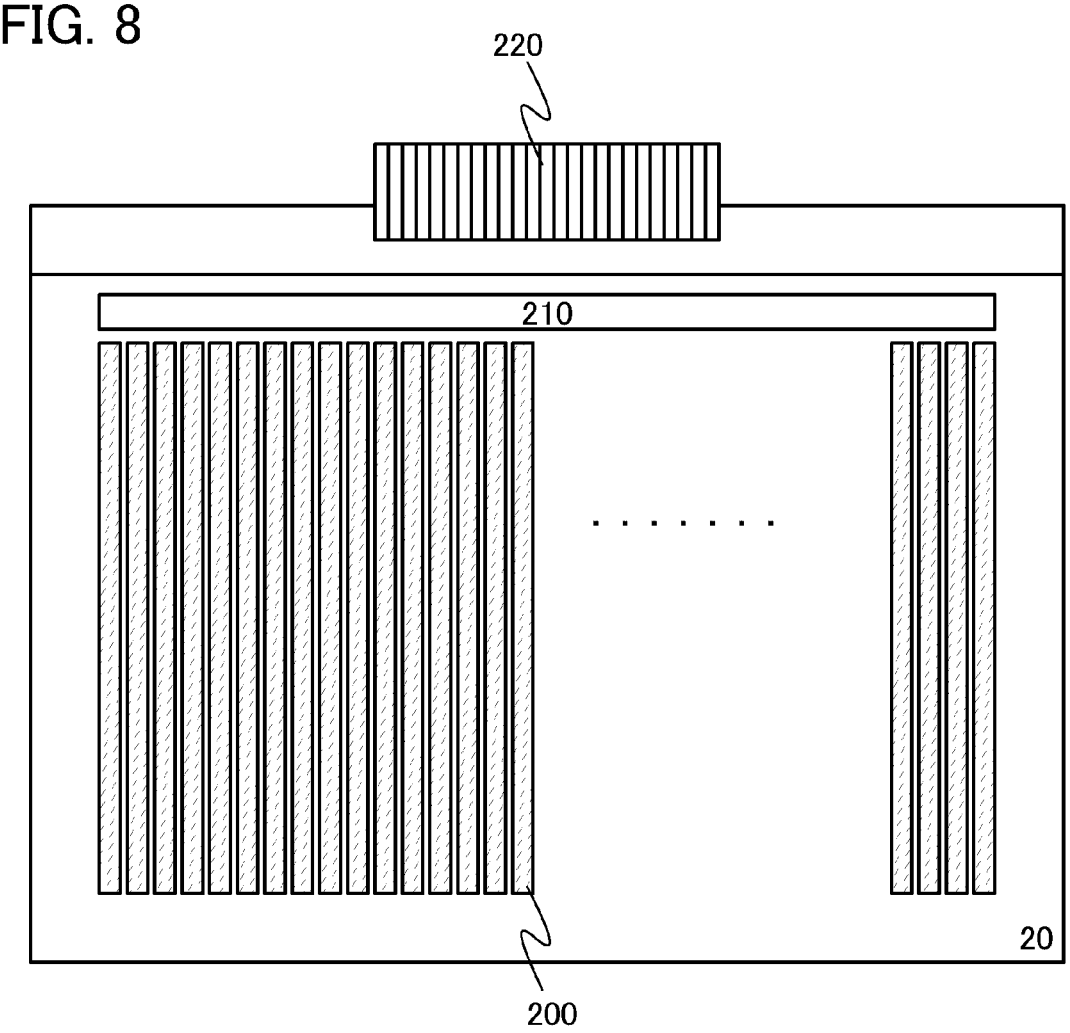

DISPLAY DEVICE

BACKGROUND OF THE INVENTION

1. Field of the Invention

The present invention relates to a display device. In particular, the present invention relates to a display device capable of displaying a three-dimensional (3D) image.

2. Description of the Related Art

Display devices are widely used, ranging from large display devices such as television devices to small display devices such as mobile phones. The display device includes a display portion in which a plurality of pixels are provided in matrix. An image is formed on the display portion in such a manner that each of the pixels displays a predetermined color. In recent years, display devices capable of displaying 3D images have been developed.

An example of a display method for displaying 3D images is a method (hereinafter also referred to as a stereoscopic method) which has a period in which display for a left eye is performed on a display portion and a period in which display for a right eye is performed on the display portion. In this method, a viewer wears glasses with which the display for the left eye is perceived only by the left eye and the display for the right eye is perceived only by the right eye. Another example of a display method for displaying 3D images is a method (hereinafter also referred to as an autostereoscopic method) which uses pixels for a left eye and pixels for a right eye in a display portion and utilizes a structure (a parallax barrier or the like) with which the display for the left eye is perceived only by the left eye and the display for the right eye is perceived only by the right eye.

It is not necessary to prepare glasses to see 3D images in the case of autostereoscopic display, which offers high convenience. Note that when two-dimensional (2D) images are displayed with a display device for autostereoscopic 3D display, the resolution of the 2D images is low because of a structure unique to an autostereoscopic method (a parallax barrier or the like).

Patent Document 1 discloses a display device in which the resolution of 2D images can be prevented from being decreased in the case of the display device for 3D images with the use of an autostereoscopic method. Specifically, the display device disclosed in Patent Document 1 forms a parallax barrier with the use of liquid crystal whose alignment state is controlled by a voltage applied thereto. With this structure, it is possible to determine whether or not a parallax barrier is used in the display device.

That is, the display device can display 3D images when the parallax barrier is used and can display 2D images when the parallax barrier is not used.

REFERENCE

[Patent Document 1] Japanese Published Patent Application No. 2005-258013

SUMMARY OF THE INVENTION

When 3D images are displayed with the use of a parallax barrier, a problem of crosstalk is prone to become obvious. Here, the crosstalk means that a pixel for a left eye is perceived by a right eye or a pixel for the right eye is perceived by the left eye.

In view of the above problems, an object of one embodiment of the present invention is to prevent crosstalk from occurring in a display device displaying 3D images.

A display device according to one embodiment of the present invention has a means for detecting positional data of a viewer and forms a parallax barrier on the basis of the positional data.

Specifically, according to one embodiment of the present invention, a display device includes a display panel configured to perform display with the use of a plurality of pixels arranged in matrix, a shutter panel configured to form a parallax barrier by controlling a voltage applied to liquid crystal in accordance with a signal input to each of light-transmitting electrodes provided in a striped manner, and a positional data detecting means for detecting positional data of a viewer. The shutter panel is provided on a display surface side of the display panel. The light-transmitting electrode is provided to be parallel or substantially parallel with a column of the plurality of pixels arranged in matrix. A width of the light-transmitting electrode is smaller than each width (length in a row direction) of the plurality of pixels arranged in matrix. A signal input to the plurality of light-transmitting electrodes is determined on the basis of the positional data when a plurality of pixels in a column for display for a left eye, which is included in the plurality of pixels arranged in matrix, performs the display for the left eye and the plurality of pixels in a column for display for a right eye, which is included in the plurality of pixels arranged in matrix and is not provided in the column for display for a left eye, performs the display for the right eye.

A display device according to one embodiment of the present invention can form a parallax barrier on the basis of positional data. Therefore, crosstalk can be prevented from occurring.

BRIEF DESCRIPTION OF THE DRAWINGS

FIG. 8 illustrates a specific example of a pixel.

DETAILED DESCRIPTION OF THE INVENTION

Embodiments of the present invention will be described below in detail. Note that the present invention is not limited to the following description, and a variety of changes can be made without departing from the spirit and scope of the present invention. Therefore, the invention should not be construed as being limited to the following description.

<Structural Example of Display Device>

Figure 1A:
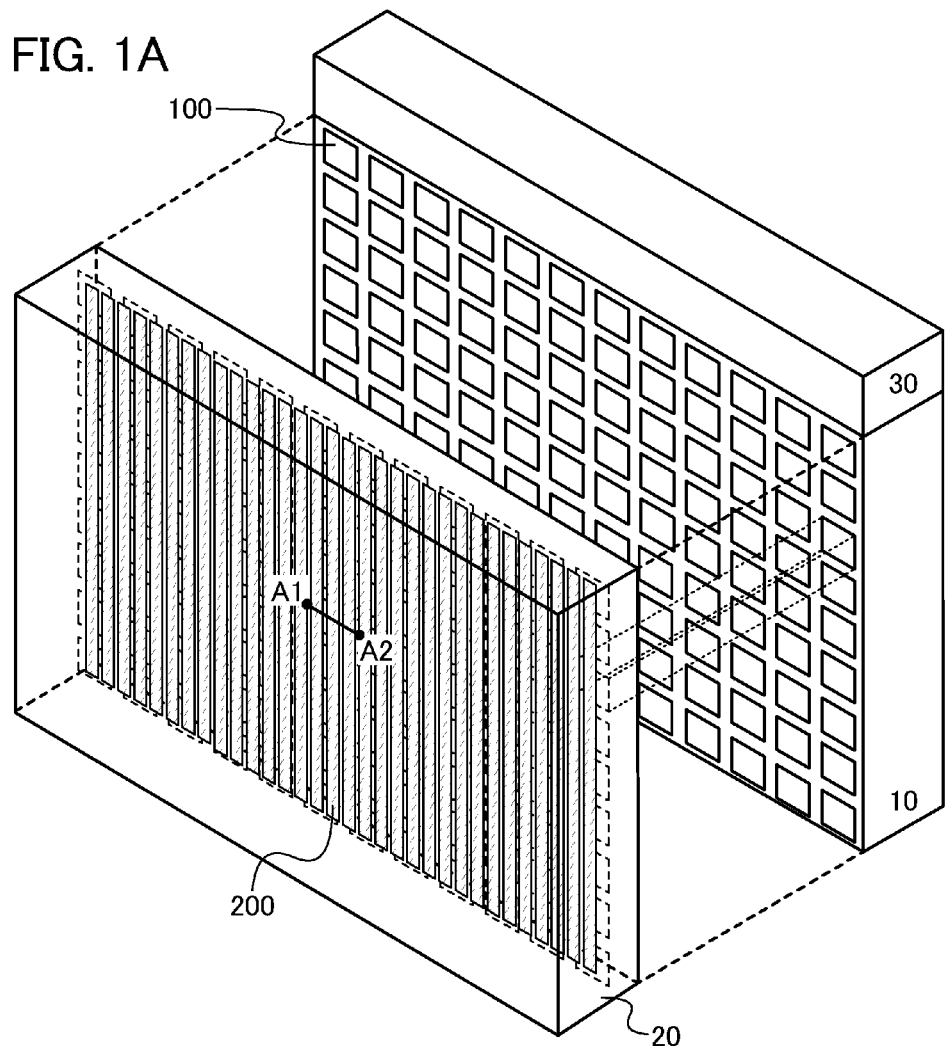
FIG. 1A illustrates an example of the structure of a display device and FIGS. 1B and 1C are a plan view and a cross-sectional view illustrating an example of the structure of a shutter panel.

FIG. 1A illustrates a structural example of a display device according to one embodiment of the present invention. The display device illustrated in FIG. 1A includes a display panel 10 for displaying an image, a shutter panel 20 forming a parallax barrier, and a positional data detecting means 30 for detecting positional data of a viewer. Note that the display panel 10 displays an image with the use of a plurality of pixels 100 arranged in matrix. The shutter panel 20 is provided on the side of the display surface of the display panel 10. Light-transmitting electrodes 200 are provided to be parallel or substantially parallel with the columns of the plurality of pixels 100 arranged in matrix. The width of the light-transmitting electrode 200 is smaller than each width (length in a row direction) of the plurality of pixels 100 arranged in matrix.

Note that the display panel 10 illustrated in FIG. 1A can be a display panel in which a voltage applied to liquid crystal is controlled so that a predetermined color is displayed in the pixel 100 (what is called a liquid crystal panel), a display panel in which a predetermined color is displayed with the use of organic electroluminescence (also referred to as organic EL) in the pixel 100 (what is called an organic EL panel), or the like. Further, the positional data detecting means 30 illustrated in FIG. 1A can be a detecting means utilizing an ultrasonic wave as a detecting medium (what is called an ultrasonic sensor), a detecting means utilizing an infrared ray as a detecting medium (what is called an infrared sensor), or the like.

Figure 1B:
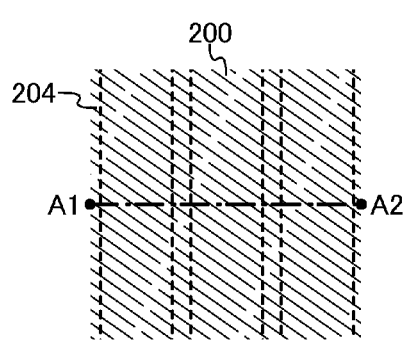
Figure 1C:
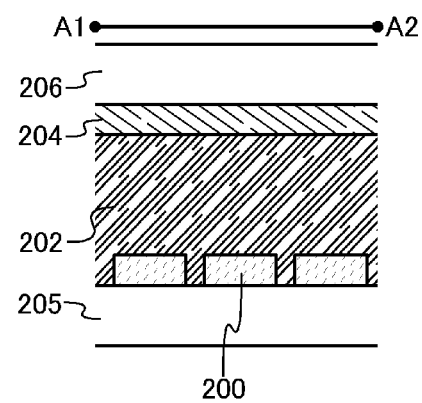

FIGS. 1B and 1C illustrate a structural example of the shutter panel 20 included in the display device illustrated in FIG. 1A. Specifically, FIG. 1B is a plan view illustrating a structural example of the shutter panel 20 including a region of a cross section taken along line A1-A2 in FIG. 1A, and FIG. 1C is a cross-sectional view illustrating a structural example of the shutter panel 20 taken along line A1-A2 in FIG. 1A. The shutter panel 20 illustrated in FIGS. 1B and 1C includes a substrate 205 and a substrate 206 which are provided to face each other; the plurality of light-transmitting electrodes 200 which are provided over a surface of the substrate 205 facing the substrate 206; an electrode 204 which is provided over a surface of the substrate 206 facing the substrate 205; and liquid crystal 202 which is provided between the plurality of light-transmitting electrodes 200 and the electrode 204. Note that the substrate 205, the substrate 206, and the electrode 204 have a light-transmitting property.

The shutter panel 20 illustrated in FIGS. 1A to 1C forms a parallax barrier in such a manner that a voltage applied to the liquid crystal 202 is controlled in accordance with a signal input to the plurality of light-transmitting electrodes 200. Specifically, the alignment of the liquid crystal between each of the plurality of light-transmitting electrodes 200 and the electrode 204 is controlled in accordance with a signal input to each of the plurality of light-transmitting electrodes 200.

Here, the shutter panel 20 is a panel (also referred to as a normally white panel) in which the lower a voltage applied to the liquid crystal becomes, the higher light transmittance becomes. The signal is a signal for blocking light passing through the whole of or substantially whole of a region in which the light-transmitting electrode 200 is provided (a light-block signal) or a signal for transmitting light through the whole of or substantially whole of the region (a light transmission signal). Further, a signal input to the plurality of light-transmitting electrodes 200 can be individually controlled.

The display device illustrated in FIGS. 1A to 1C can display 2D images in such a manner that display for both eyes is performed in all of the plurality of pixels 100 and light transmission signals are input to all of the light-transmitting electrodes 200. The display device illustrated in FIGS. 1A to 1C can also display 3D images in such a manner that display for a left eye is performed in part of the plurality of pixels 100, display for a right eye is performed in the other part of the plurality of pixels 100, light transmission signals are input to part of the plurality of light-transmitting electrodes 200, and light-block signals are input to the other part of the plurality of light-transmitting electrodes 200.

<Example of Method for Driving Display Device 1 (Eyes at Reference Point)>

Figure 2A:
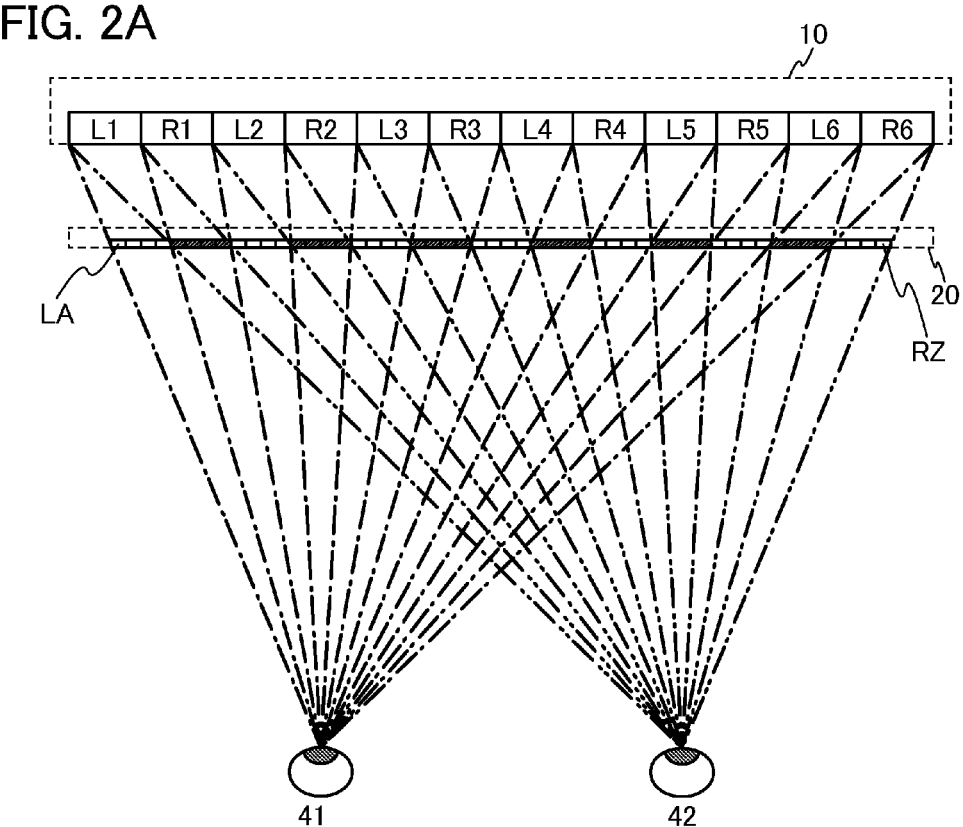
FIG. 2A illustrates an example of a method for driving a display device and FIG. 2B illustrates an example of a method for driving a shutter panel.
Figure 2B:
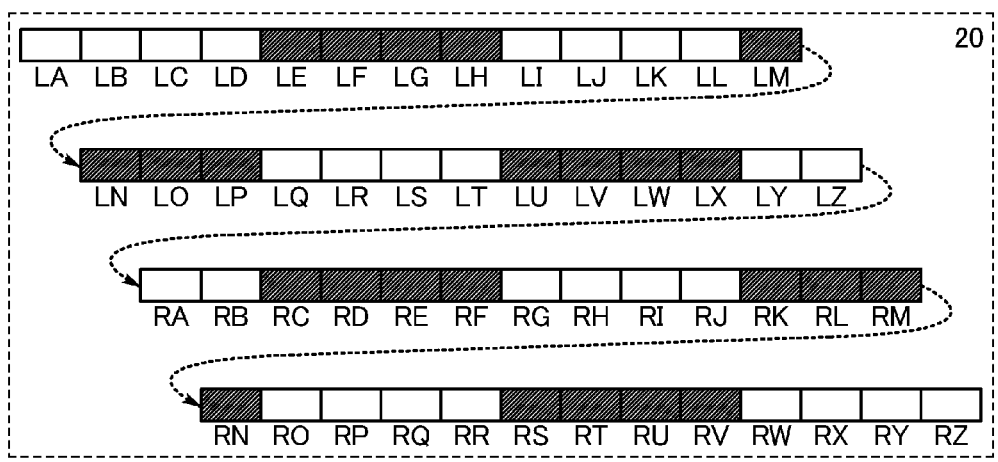

FIGS. 2A and 2B are schematic views illustrating an example of a method for driving the display device illustrated in FIGS. 1A to 1C. Specifically, FIG. 2A is a schematic cross-sectional view of the plurality of pixels 100 arranged in matrix in the display device illustrated in FIGS. 1A to 1C, taken along a row direction. FIG. 2B is a magnified view of the shutter panel 20 illustrated in FIG. 2A. Note that FIGS. 2A and 2B illustrate an example of a driving method in the case where the display device recognizes, on the basis of positional data detected by the positional data detecting means 30, that a viewer is at a reference point.

Note that in the display panel 10 illustrated in FIG. 2A, L1 to L6 each represent the pixel 100 performing display for a left eye and R1 to R6 each represent the pixel 100 performing display for a right eye. Further, each of LA to LZ in the shutter panel 20 illustrated in FIGS. 2A and 2B is a region which exists on the left side of the shutter panel 20 seen from the viewer and can be in a light-transmitting state or a light-blocking state. Each of RA to RZ in the shutter panel 20 illustrated in FIGS. 2A and 2B is a region which exists on the right side of the shutter panel 20 seen from the viewer and can be in a light-transmitting state or a light-blocking state (reference symbols except for LA and RZ are not shown in FIG. 2A). In the regions LA to LZ and RA to RZ, a white region is in a light-transmitting state (a light transmission signal is input to the light-transmitting electrode 200 in the region) and a diagonally shaded region is in a light-blocking state (a light-block signal is input to the light-transmitting electrode 200 in the region). Further, FIG. 2A also illustrates a left eye 41 and a right eye 42 of the viewer.

In an example of a driving method illustrated in FIGS. 2A and 2B, assuming that the columns are counted from the leftmost column of the display panel 10 seen from the viewer, display for the left eye is performed in the pixels L1 to L6 provided in odd-numbered columns and display for the right eye is performed in the pixels R1 to R6 provided in even-numbered columns. Further, in the example of the driving method illustrated in FIGS. 2A and 2B, the regions LA to LD, LI to LL, LQ to LT, LY to RB, RG to RJ, RO to RR, and RW to RZ in the shutter panel 20 are in a light-transmitting state and the regions LE to LH, LM to LP, LU to LX, RC to RF, RK to RN, and RS to RV in the shutter panel 20 are in a light-blocking state. This structure prevents the right eye 42 from perceiving the pixels for display for the left eye and prevents the left eye 41 from perceiving the pixels for display for the right eye.

Specifically, the regions LE to LH are in a light-blocking state, so that the left eye 41 and the right eye 42 are prevented from perceiving the pixel R1 and the pixel L1, respectively. The regions LM to LP are in a light-blocking state, so that the left eye 41 and the right eye 42 are prevented from perceiving the pixel R2 and the pixel L2, respectively. The regions LU to LX are in a light-blocking state, so that the left eye 41 and the right eye 42 are prevented from perceiving the pixel R3 and the pixel L3, respectively. The regions RC to RF are in a light-blocking state, so that the left eye 41 and the right eye 42 are prevented from perceiving the pixel R4 and the pixel L4, respectively. The regions RK to RN are in a light-blocking state, so that the left eye 41 and the right eye 42 are prevented from perceiving the pixel R5 and the pixel L5, respectively. The regions RS to RV are in a light-blocking state, so that the left eye 41 and the right eye 42 are prevented from perceiving the pixel R6 and the pixel L6, respectively.

<Example of Method for Driving Display Device 2 (Locations of Eyes Moved to Left from Reference Point)>

Figure 3A:
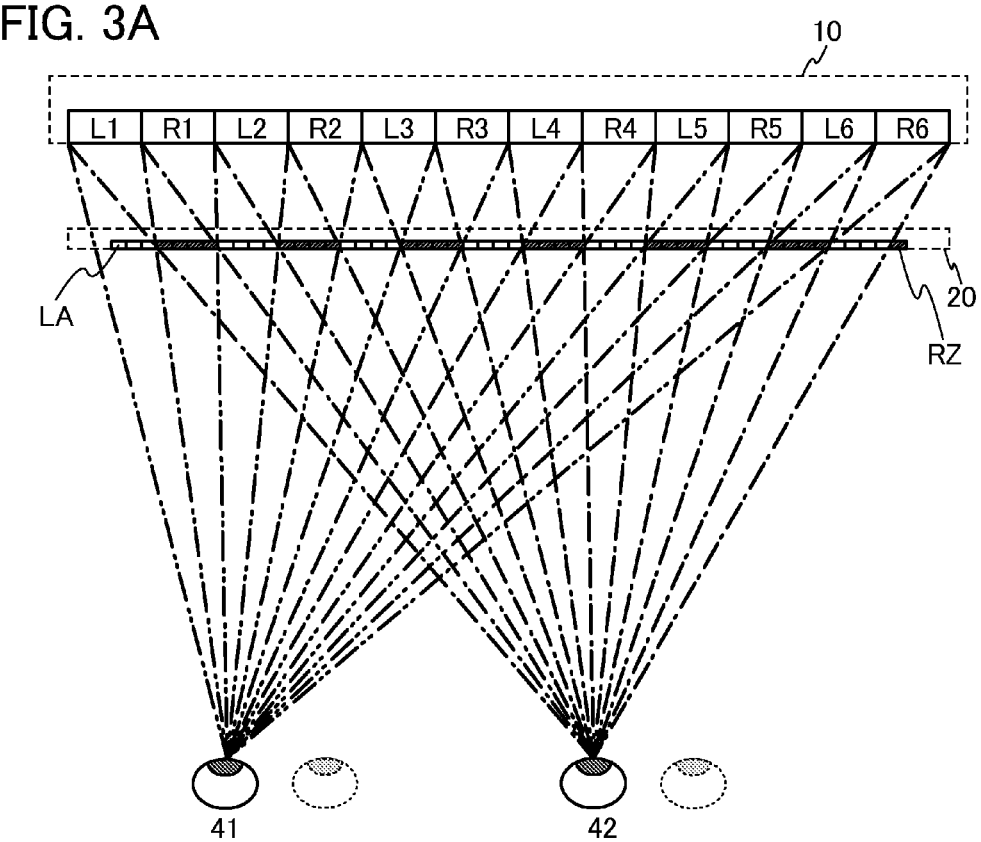
FIG. 3A illustrates an example of a method for driving a display device and FIG. 3B illustrates an example of a method for driving a shutter panel.
Figure 3B:
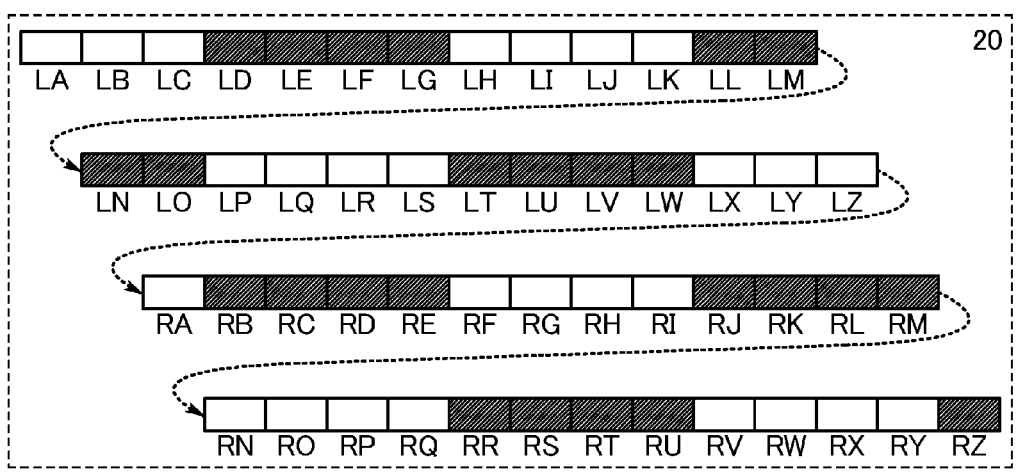

FIGS. 3A and 3B are schematic views illustrating an example of a method for driving the display device illustrated in FIGS. 1A to 1C. Note that the example of the driving method illustrated in FIGS. 3A and 3B is different from the example of the driving method illustrated in FIGS. 2A and 2B in the locations of eyes (a left eye and a right eye illustrated in FIG. 3A with a dotted line shows the locations of the eyes in FIG. 2A). Specifically, FIGS. 3A and 3B illustrate an example of a driving method in the case where the display device recognizes, on the basis of positional data detected by the positional data detecting means 30, that the viewer has moved from the reference point to the left side.

The reference symbols (L1 to L6 and the like) and the like in FIGS. 3A and 3B each indicate the same components as the reference symbols and the like in FIGS. 2A and 2B.

In the example of the driving method illustrated in FIGS. 3A and 3B, the display panel 10 performs the same display as the display panel 10 illustrated in FIG. 2A. Further, in the example of the driving method illustrated in FIGS. 3A and 3B, the regions LA to LC, LH to LK, LP to LS, LX to RA, RF to RI, RN to RQ, and RV to RY in the shutter panel 20 are in a light-transmitting state and the regions LD to LG, LL to LO, LT to LW, RB to RE, RJ to RM, RR to RU, and RZ in the shutter panel 20 are in a light-blocking state. The shutter panel 20 in the example of the driving method illustrated in FIGS. 3A and 3B is different from that in FIGS. 2A and 2B in that the regions LD, LL, LT, RB, RJ, RR, and RZ are in a light-blocking state and the regions LH, LP, LX, RF, RN, and RV are in a light-transmitting state. In short, in the example of the driving method illustrated in FIGS. 3A and 3B, the regions in a light-blocking state are moved to the left side by one region in comparison with the case of FIG. 2A. This structure prevents the right eye 42 from perceiving the pixels for display for the left eye and prevents the left eye 41 from the pixels for display for the right eye.

Specifically, the regions LD to LG are in a light-blocking state, so that the left eye 41 and the right eye 42 are prevented from perceiving the pixel R1 and the pixel L1, respectively. The regions LL to LO are in a light-blocking state, so that the left eye 41 and the right eye 42 are prevented from perceiving the pixel R2 and the pixel L2, respectively. The regions LT to LW are in a light-blocking state, so that the left eye 41 and the right eye 42 are prevented from perceiving the pixel R3 and the pixel L3, respectively. The regions RB to RE are in a light-blocking state, so that the left eye 41 and the right eye 42 are prevented from perceiving the pixel R4 and the pixel L4, respectively. The regions RJ to RM are in a light-blocking state, so that the left eye 41 and the right eye 42 are prevented from perceiving the pixel R5 and the pixel L5, respectively. The regions RR to RU are in a light-blocking state, so that the left eye 41 and the right eye 42 are prevented from perceiving the pixel R6 and the pixel L6, respectively.

<Example of Method for Driving Display Device 3 (Locations of Eyes Moved to Right from Reference Point)>

Figure 4A:
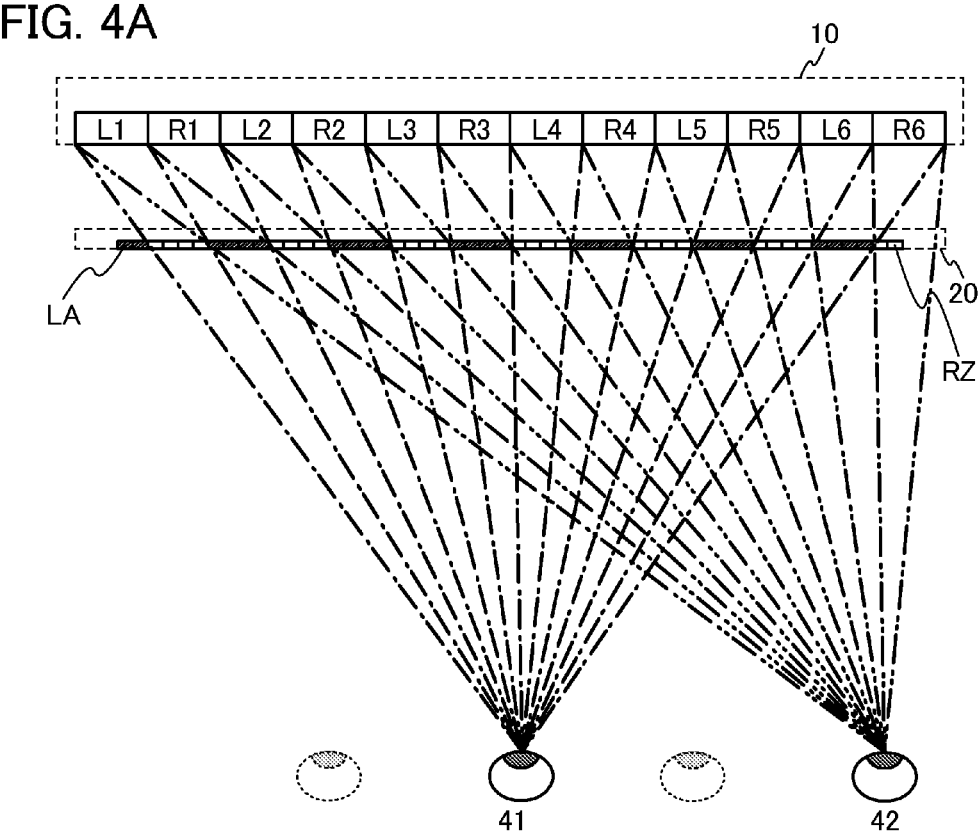
FIG. 4A illustrates an example of a method for driving a display device and FIG. 4B illustrates an example of a method for driving a shutter panel.
Figure 4B:
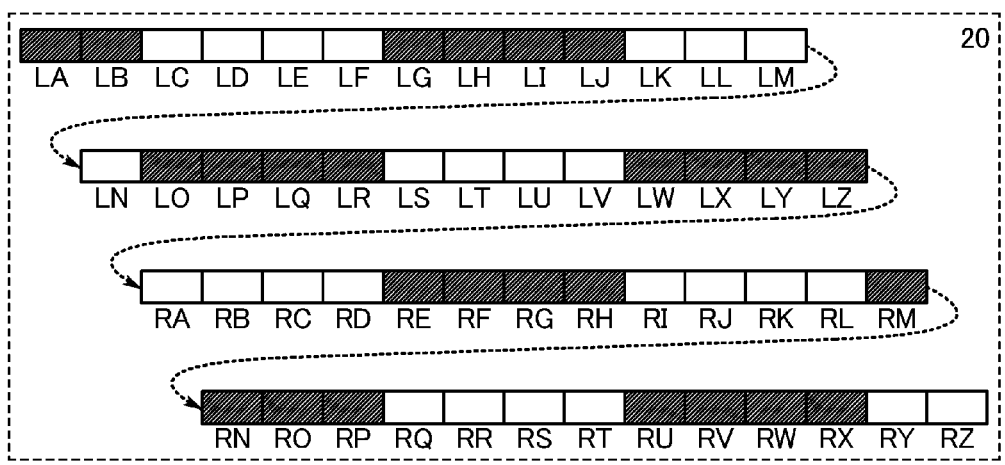

FIGS. 4A and 4B are schematic views illustrating an example of a method for driving the display device illustrated in FIGS. 1A to 1C. Note that the example of the driving method illustrated in FIGS. 4A and 4B is different from the examples of the driving method illustrated in FIGS. 2A and 2B and FIGS. 3A and 3B in the locations of eyes (a left eye and a right eye illustrated in FIG. 4A with a dotted line shows the locations of the eyes in FIG. 2A). Specifically, FIGS. 4A and 4B illustrate an example of a driving method in the case where the display device recognizes, on the basis of positional data detected by the positional data detecting means 30, that the viewer has moved from the reference point to the right side. Note that the difference in the locations of the eyes between the example of the driving method illustrated in FIGS. 4A and 4B and the example of the driving method illustrated in FIGS. 2A and 2B is larger than the difference in the locations of the eyes between the example of the driving method illustrated in FIGS. 3A and 3B and the example of the driving method illustrated in FIGS. 2A and 2B.

The reference symbols (L1 to L6 and the like) and the like in FIGS. 4A and 4B each indicate the same components as the reference symbols and the like in FIGS. 2A and 2B.

In the example of the driving method illustrated in FIGS. 4A and 4B, the display panel 10 performs the same display as the display panel 10 illustrated in FIG. 2A. Further, in the example of the driving method illustrated in FIGS. 4A and 4B, the regions LC to LF, LK to LN, LS to LV, RA to RD, RI to RL, RQ to RT, RY, and RZ in the shutter panel 20 are in a light-transmitting state and the regions LA, LB, LG to LJ, LO to LR, LW to LZ, RE to RH, RM to RP, and RU to RX in the shutter panel 20 are in a light-blocking state. The shutter panel 20 in the example of the driving method illustrated in FIGS. 4A and 4B is different from that in FIGS. 2A and 2B in that the regions LA, LB, LI, LJ, LQ, LR, LY, LZ, RG, RH, RO, RP, RW, and RX are in a light-blocking state and the regions LE, LF, LM, LN, LU, LV, RC, RD, RK, RL, RS, and RT are in a light-transmitting state. In short, the example of the driving method illustrated in FIGS. 4A and 4B, the regions in a light-blocking state are moved to the right side by two regions in comparison with the case of FIGS. 2A and 2B. This structure prevents the right eye 42 from perceiving the pixels for display for the left eye and prevents the left eye 41 from the pixels for display for the right eye.

Specifically, the regions LG to LJ are in a light-blocking state, so that the left eye 41 and the right eye 42 are prevented from perceiving the pixel R1 and the pixel L1, respectively. The regions LO to LR are in a light-blocking state, so that the left eye 41 and the right eye 42 are prevented from perceiving the pixel R2 and the pixel L2, respectively. The regions LW to LZ are in a light-blocking state, so that the left eye 41 and the right eye 42 are prevented from perceiving the pixel R3 and the pixel L3, respectively. The regions RE to RH are in a light-blocking state, so that the left eye 41 and the right eye 42 are prevented from perceiving the pixel R4 and the pixel L4, respectively. The regions RM to RP are in a light-blocking state, so that the left eye 41 and the right eye 42 are prevented from perceiving the pixel R5 and the pixel L5, respectively. The regions RU to RX are in a light-blocking state, so that the left eye 41 and the right eye 42 are prevented from perceiving the pixel R6 and the pixel L6, respectively.

<Example of Method for Driving Display Device 4 (Locations of Eyes Moved Closer to Display Panel from Reference Point)>

Figure 5A:
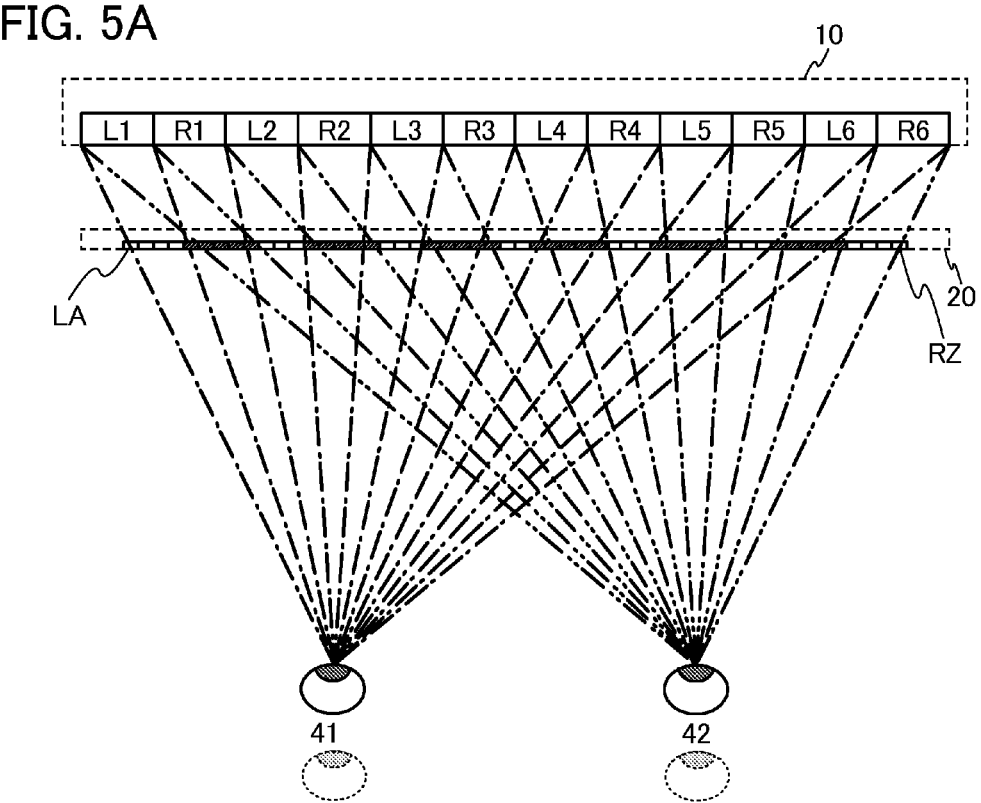
FIG. 5A illustrates an example of a method for driving a display device and FIG. 5B illustrates an example of a method for driving a shutter panel.
Figure 5B:
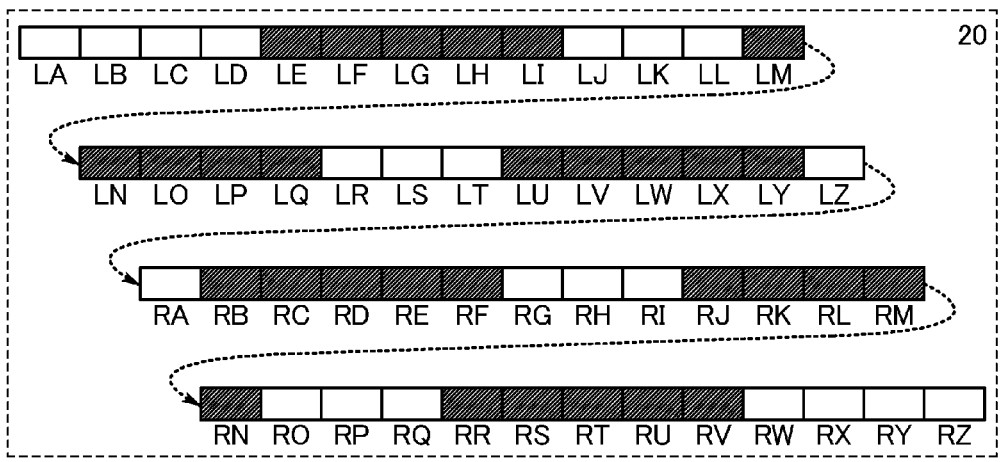

FIGS. 5A and 5B are schematic views illustrating an example of a method for driving the display device illustrated in FIGS. 1A to 1C. Note that the example of the driving method illustrated in FIGS. 5A and 5B is different from the examples of the driving method illustrated in FIGS. 2A and 2B, FIGS. 3A and 3B, and FIGS. 4A and 4B in the locations of eyes (a left eye and a right eye illustrated in FIG. 5A with a dotted line shows the locations of the eyes in FIG. 2A). Specifically, FIGS. 5A and 5B illustrate an example of a driving method in the case where the display device recognizes on the basis of positional data detected by the positional data detecting means 30 that the viewer is closer to the display panel than the reference point.

The reference symbols (L1 to L6 and the like) and the like in FIGS. 5A and 5B each indicate the same components as the reference symbols and the like in FIGS. 2A and 2B.

In the example of the driving method illustrated in FIGS. 5A and 5B, the display panel 10 performs the same display as the display panel 10 illustrated in FIG. 2A. Further, in the example of the driving method illustrated in FIGS. 5A and 5B, the regions in a light-blocking state in the shutter panel 20 illustrated in FIGS. 2A and 2B are the regions in a light-blocking state. In addition, in the example of the driving method illustrated in FIGS. 5A and 5B, the regions LI, LQ, LY, RB, RJ, and RR in the shutter panel 20 become a light-blocking state. In short, in the example of the driving method illustrated in FIGS. 5A and 5B, seen from the viewer, the light-blocking region on the left side of the shutter panel 20 is extended by one region to the right side, and additionally, seen from the viewer, the light-blocking region on the right side of the shutter panel 20 is extended by one region to the left side, in comparison with the case of FIG. 2A. This structure prevents the right eye 42 from perceiving the pixels for display for the left eye and prevents the left eye 41 from the pixels for display for the right eye.

Specifically, the regions LE to LI are in a light-blocking state, so that the left eye 41 and the right eye 42 are prevented from perceiving the pixel R1 and the pixel L1, respectively. The regions LM to LQ are in a light-blocking state, so that the left eye 41 and the right eye 42 are prevented from perceiving the pixel R2 and the pixel L2, respectively. The regions LU to LY are in a light-blocking state, so that the left eye 41 and the right eye 42 are prevented from perceiving the pixel R3 and the pixel L3, respectively. The regions RB to RF are in a light-blocking state, so that the left eye 41 and the right eye 42 are prevented from perceiving the pixel R4 and the pixel L4, respectively. The regions RJ to RN are in a light-blocking state, so that the left eye 41 and the right eye 42 are prevented from perceiving the pixel R5 and the pixel L5, respectively. The regions RR to RV are in a light-blocking state, so that the left eye 41 and the right eye 42 are prevented from perceiving the pixel R6 and the pixel L6, respectively.

<Example of Method for Driving Display Device 5 (Locations of Eyes Moved Further from Reference Point)>

Figure 6A:
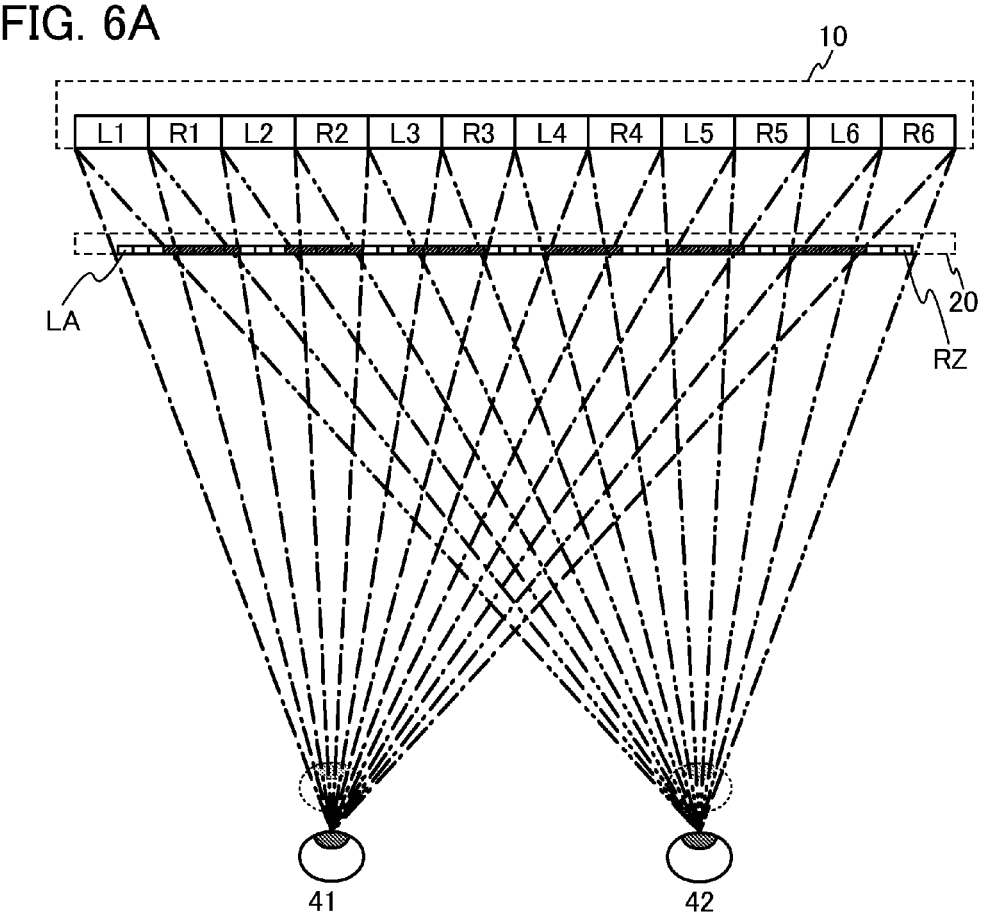
FIG. 6A illustrates an example of a method for driving a display device and FIG. 6B illustrates an example of a method for driving a shutter panel.
Figure 6B:
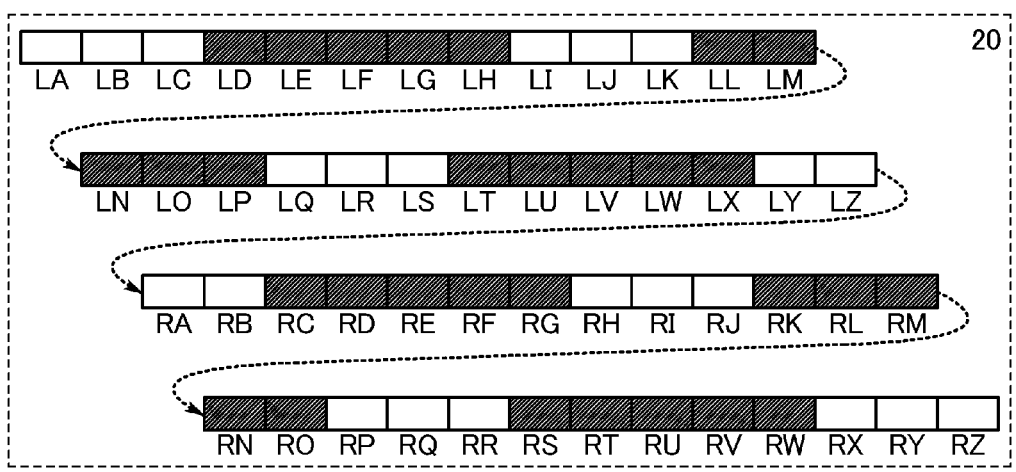

FIGS. 6A and 6B are schematic views illustrating an example of a method for driving the display device illustrated in FIGS. 1A to 1C. Note that the example of the driving method illustrated in FIGS. 6A and 6B is different from the examples of the driving method illustrated in FIGS. 2A and 2B, FIGS. 3A and 3B, FIGS. 4A and 4B, and FIGS. 5A and 5B in the locations of eyes (a left eye and a right eye illustrated in FIG. 6A with a dotted line shows the locations of the eyes in FIG. 2A). Specifically, FIGS. 6A and 6B illustrate an example of a driving method in the case where the display device recognizes on the basis of positional data detected by the positional data detecting means 30 that the viewer is further from the display panel than the reference point.

The reference symbols (L1 to L6 and the like) and the like in FIGS. 6A and 6B each indicate the same components as the reference symbols and the like in FIGS. 2A and 2B.

In the example of the driving method illustrated in FIGS. 6A and 6B, the display panel 10 performs the same display as the display panel 10 illustrated in FIG. 2A. Further, in the example of the driving method illustrated in FIGS. 6A and 6B, the regions in a light-blocking state in the shutter panel 20 illustrated in FIGS. 2A and 2B are the regions in a light-blocking state. In addition, in the example of the driving method illustrated in FIGS. 6A and 6B, the regions LD, LL, LT, RG, RO, and RW in the shutter panel 20 become a light-blocking state. In short, in the example of the driving method illustrated in FIGS. 6A and 6B, seen from the viewer, the light-blocking region on the left side of the shutter panel 20 is extended by one region to the left side, and additionally, seen from the viewer, the light-blocking region on the right side of the shutter panel 20 is extended by one region to the right side, in comparison with the case of FIG. 2A. This structure prevents the right eye 42 from perceiving the pixels for display for the left eye and prevents the left eye 41 from the pixels for display for the right eye.

Specifically, the regions LD to LH are in a light-blocking state, so that the left eye 41 and the right eye 42 are prevented from perceiving the pixel R1 and the pixel L1, respectively. The regions LL to LP are in a light-blocking state, so that the left eye 41 and the right eye 42 are prevented from perceiving the pixel R2 and the pixel L2, respectively. The regions LT to LX are in a light-blocking state, so that the left eye 41 and the right eye 42 are prevented from perceiving the pixel R3 and the pixel L3, respectively. The regions RC to RG are in a light-blocking state, so that the left eye 41 and the right eye 42 are prevented from perceiving the pixel R4 and the pixel L4, respectively. The regions RK to RO are in a light-blocking state, so that the left eye 41 and the right eye 42 are prevented from perceiving the pixel R5 and the pixel L5, respectively. The regions RS to RW are in a light-blocking state, so that the left eye 41 and the right eye 42 are prevented from perceiving the pixel R6 and the pixel L6, respectively.

<Display Device Disclosed in This Specification>

The display device disclosed in this specification includes a means for detecting positional data of the viewer. Further, a parallax barrier can be formed on the basis of the positional data (see FIGS. 2A and 2B, FIGS. 3A and 3B, FIGS. 4A and 4B, FIGS. 5A and 5B, and FIGS. 6A and 6B). Accordingly, crosstalk perceived by the viewer can be prevented.

<Specific Example of Display Panel>

In the above display device, a striped parallax barrier is formed to be parallel or substantially parallel with the columns of the plurality of pixels 100 arranged in matrix. Accordingly, in the above display device, depending on the locations of the eyes of the viewer, it is possible that the right eye (left eye) of the viewer cannot perceive part of the right region or the left region of the pixel 100 performing display for the right eye (left eye). Therefore, the above display device is preferably designed so that the viewer perceives display of a predetermined color even when part of the pixel 100 is not perceived.

Figure 7A:
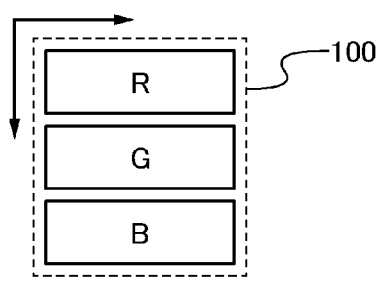
FIGS. 7A and 7B illustrate a specific example of a pixel.
Figure 7B:
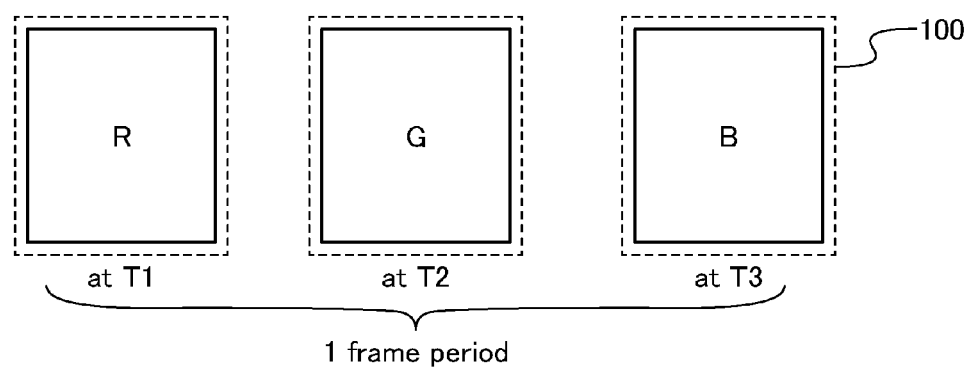

FIGS. 7A and 7B illustrate a specific example of the pixel 100 in which the viewer perceives display of a predetermined color even when the right eye (left eye) of the viewer does not perceive part of the right region or the left region of the pixel 100.

Specifically, the pixel 100 illustrated in FIG. 7A includes a subpixel displaying red (denoted by "R" in the drawings), a subpixel displaying green (denoted by "G" in the drawings), and a subpixel displaying blue (in the drawings, denoted by "B" in the drawings). The subpixels are arranged in a column direction. Further, in the pixel 100 illustrated in FIG. 7A, the colors displayed by these subpixels are adjusted, whereby a predetermined color can be displayed. Note that the subpixel displaying red can be formed in such a manner that a color filter which absorbs the wavelength of the visible light region except for the wavelength of red light is provided for the subpixel or that an element emitting red light is provided for the subpixel, for example. The subpixel displaying green and the subpixel displaying blue can be formed in a similar manner. In the pixel 100 illustrated in FIG. 7A, the viewer can perceive display of the subpixels even when part of the right region or the left region of the pixel 100 is not perceived. Accordingly, the viewer can perceive display of color in the pixel 100.

In an operation of the pixel 100 illustrated in FIG. 7B, there are a period T1 for displaying red, a period T2 for displaying green, and a period T3 for displaying blue. The pixel 100 illustrated in FIG. 7B can display a predetermined color by sequentially displaying colors in these periods (what is called a field sequential method). Note that the periods T1 to T3 illustrated in FIG. 7B are included in one frame period. In the pixel 100 illustrated in FIG. 7A, the viewer can perceive display of the pixel 100 in the periods (T1 to T3) even when part of the right region or part of the left region of the pixel 100 is not perceived. Accordingly, the viewer can perceive display of color in the pixel 100.

<Specific Example of Shutter Panel>

FIG. 8 illustrates a specific example of the shutter panel 20 included in the above display device. The shutter panel 20 illustrated in FIG. 8 includes the plurality of light-transmitting electrodes 200, a driver circuit 210 which outputs a signal to each of the plurality of light-transmitting electrodes 200, and a flexible printed wiring board 220 from which an external signal is input to the driver circuit 210. Note that the driver circuit 210 includes many semiconductor elements (transistors and the like). The semiconductor elements and the plurality of light-transmitting electrodes 200 can be formed over one substrate by a photolithography method or the like.

Figure 9A:
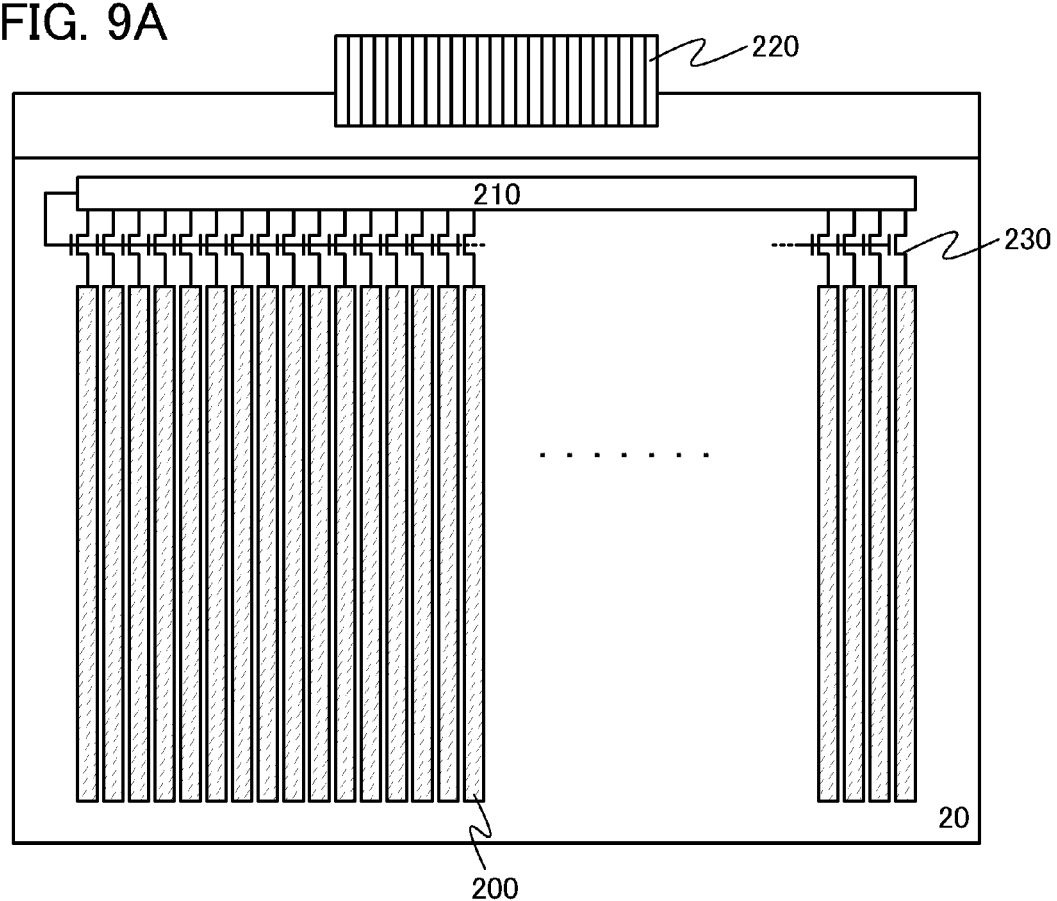
FIG. 9A illustrates a specific example of a shutter panel and FIG. 9B illustrates an example of driving of the shutter panel.

FIG. 9A illustrates a specific example of a shutter panel 20 which is different from the shutter panel 20 illustrated in FIG. 8. Specifically, the shutter panel 20 illustrated in FIG. 9A is different from the shutter panel 20 illustrated in FIG. 8 in that a plurality of transistors 230 for controlling electrical connection between the driver circuit 210 and the plurality of light-transmitting electrodes 200 are provided. Note that the switching of the transistor 230 is controlled by the driver circuit 210. Further, the transistor 230 can be formed together with the semiconductor elements, which are included in the driver circuit 210, and the plurality of light-transmitting electrodes 200, over one substrate by a photolithography method or the like.

As the transistor 230 illustrated in FIG. 9A, it is possible to use, for example, a thin film transistor whose channel is formed in a semiconductor layer containing an element that belongs to Group 14 of the periodic table (such as silicon or germanium) as its main component or a semiconductor layer containing an oxide that exhibits semiconductor properties (such an oxide is also referred to as an oxide semiconductor, and such a semiconductor layer is also referred to as an oxide semiconductor layer).

Note that an oxide semiconductor has a wide band gap and low intrinsic carrier density. Therefore, the off-state current of a thin film transistor whose channel is formed in an oxide semiconductor layer can be extremely low.

Here, the shutter panel 20 needs to be regularly or irregularly driven when a parallax barrier is formed or when the pattern of a parallax barrier is changed. In other words, a period during which the shutter panel 20 needs to operate is much shorter than a period during which the pattern of a parallax barrier formed in the shutter panel 20 is maintained. For that reason, in the period during which the pattern of the parallax barrier formed in the shutter panel 20 is maintained, it is preferable to stop supply of the power supply voltage to the driver circuit that outputs signals to the plurality of electrodes included in the shutter panel 20 because power consumption can be reduced. Note that when supply of the power supply voltage to the driver circuit is stopped, the potentials of the plurality of light-transmitting electrodes might vary and the probability that the pattern of the parallax barrier is not maintained is increased.

Figure 9B:
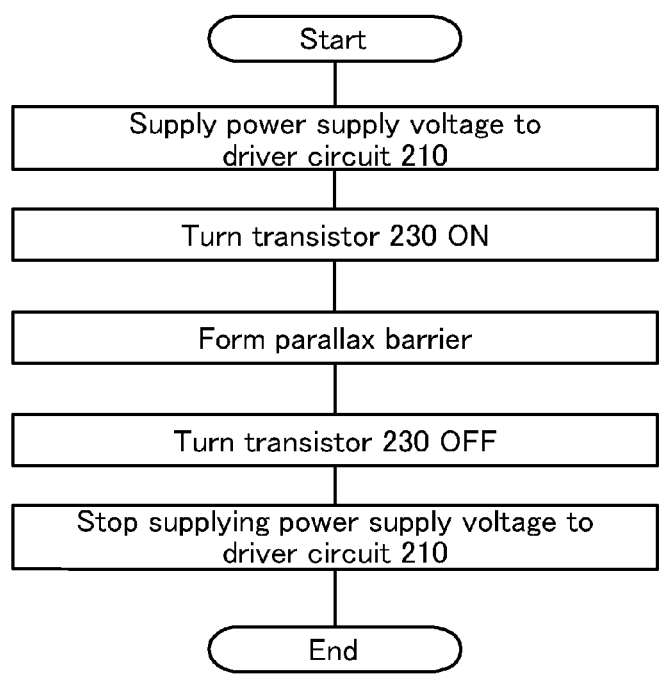

In contrast, with the structure in which a transistor whose channel is formed in an oxide semiconductor layer is used as the transistor 230 in the shutter panel 20 illustrated in FIG. 9A, variations in the potentials of the plurality of electrodes can be reduced even when supply of the power supply voltage to the driver circuit is stopped. Specifically, the display device with this structure can perform operations shown in FIG. 9B. As illustrated in FIG. 9B, in the display device with this structure, the power supply voltage can be supplied to the driver circuit only in a period including before and after a period when a parallax barrier is formed or when the pattern of a parallax barrier is changed, and supply of the power supply voltage to the driver circuit can be stopped in the other periods. In the case where a period during which the pattern of a parallax barrier is maintained is long, the power supply voltage can be supplied to the driver circuit regularly or specially and signals for forming a parallax barrier of the same pattern can be output to the plurality of electrodes.

<Specific Example of Positional Data Detecting Means>

Figure 10:
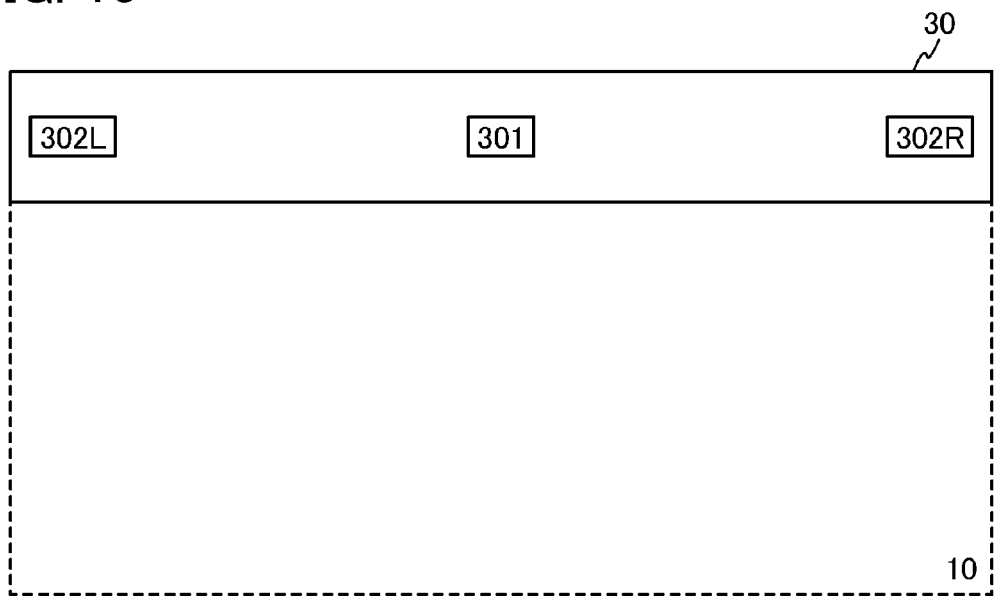
FIG. 10 illustrates a specific example of a positional data detecting means.

FIG. 10 illustrates a specific example of the positional data detecting means 30 included in the display device. The positional data detecting means 30 illustrated in FIG. 10 includes an ultrasonic wave transmitter 301 and ultrasonic wave receivers 302L and 302R. The ultrasonic wave transmitter 301 is provided above the top center of the display panel 10. The ultrasonic wave receivers 302L and 302R are provided above the top ends of the display panel 10. The positional data detecting means 30 illustrated in FIG. 10 can transmit an ultrasonic wave from the ultrasonic wave transmitter 301. In addition, the ultrasonic wave receivers 302L and 302R can receive the ultrasonic wave reflected by the viewer. The above display device can detect the positional data of the viewer with the use of the received ultrasonic wave.

Figure 11:
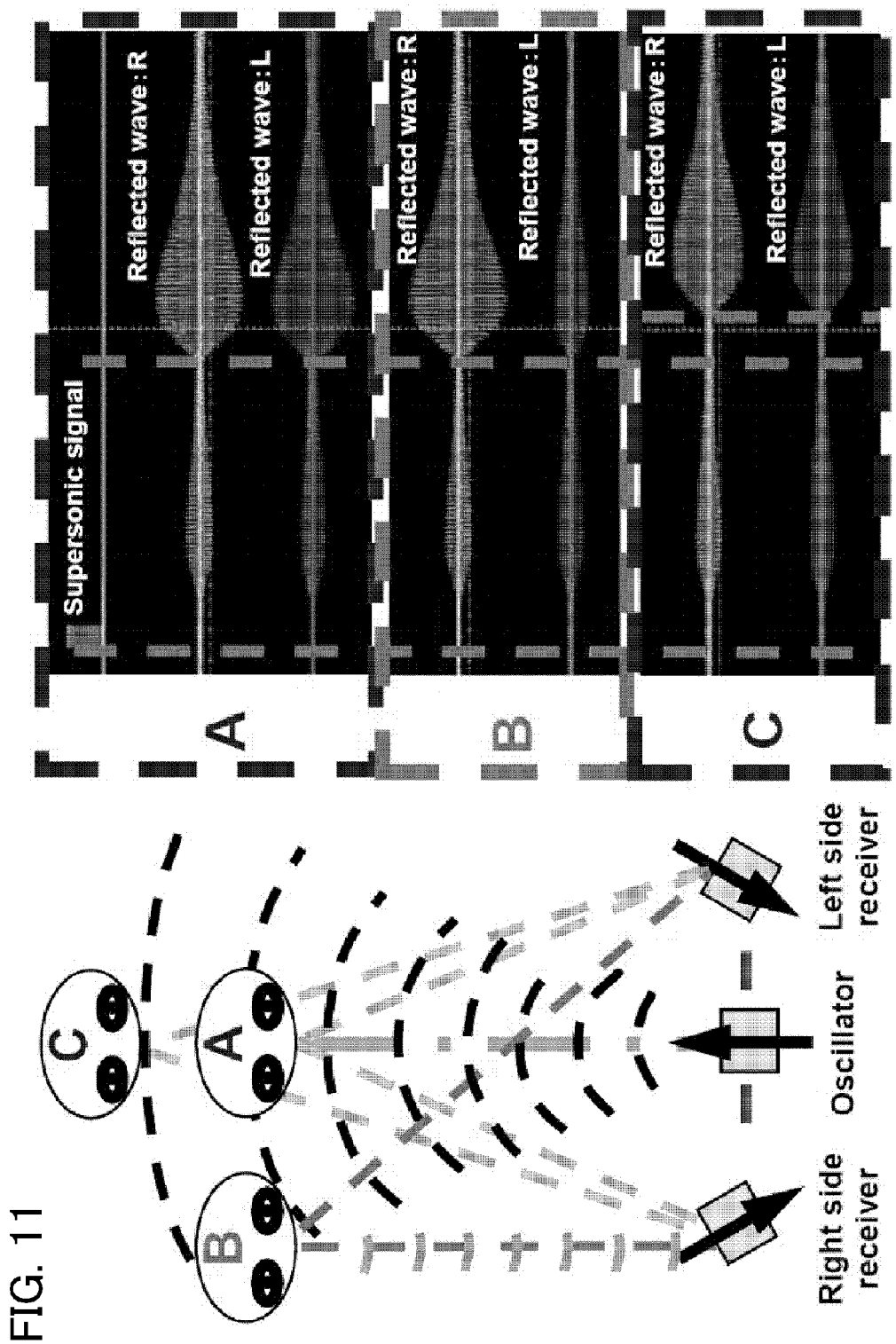
FIG. 11 an example of detecting position of a viewer with the use of a positional data detecting means.

FIG. 11 shows detection of positional data of the viewer by the positional data detecting means 30 illustrated in FIG. 10, in detail. In FIG. 11, A, B, and C are positions of the viewer. Specifically, A is the case where the viewer is at the reference point, B is the case where the viewer is on the right side of A and the distance between the viewer and the display device is similar in comparison with A, and C is the case where the viewer is at the point further than A.

Here, in the case where the viewer is at A or C, the amplitude of the ultrasonic wave (denoted by "reflected wave:R" in the drawing) received by the ultrasonic wave receiver provided on the right side of the display device (denoted by "reception:R" in the drawing) becomes equivalent to the amplitude of the ultrasonic wave (denoted by "reflected wave:L" in the drawing) received by the ultrasonic wave receiver provided on the left side of the display device (denoted by "reception:L" in the drawing). Accordingly, the display device can recognize with the use of the detected ultrasonic wave that the viewer is on a straight line where the reference point and the center of the display device are.

Further, in the case where the viewer is at B, the amplitude of the ultrasonic wave received by the ultrasonic wave receiver provided on the right side of the display device is larger than the amplitude of the ultrasonic wave received by the ultrasonic wave receiver provided on the left side of the display device. Accordingly, the display device can recognize with the use of the detected ultrasonic wave that the viewer is in front of the right side of the display device.

Further, the case where the viewer is at A and the case where the viewer is at C are different in amplitude of ultrasonic waves received by the ultrasonic wave receivers provided on the right side and the left side. Therefore, the distance between the viewer and the display device can be recognized with the use of the detected ultrasonic wave.

As described above, the positional data detecting means 30 illustrated in FIG. 10 and FIG. 11 can recognize the angle formed by the display device and the locations of the eyes of the viewer and the distance between the display device and the viewer. That is, positional data of the viewer can be detected. Further, in the above display device, a parallax barrier of the shutter panel 20 can be formed on the basis of the positional data.

Example

As a display device according to one embodiment of the present invention, a mobile phone, a portable game machine, a portable information terminal, an electronic book reader, a video camera, a digital still camera, and the like can be given. Hereinafter, specific examples of such electronic devices will be described with reference to FIGS. 12A and 12B.

Figure 12A:
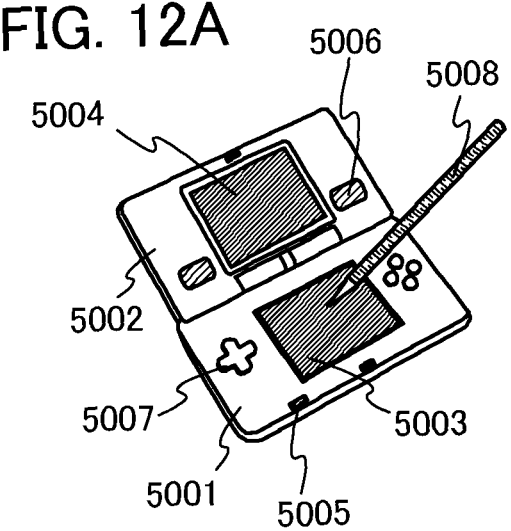
FIGS. 12A and 12B each illustrate a specific example of an electronic device.

FIG. 12A illustrates a portable game console including a housing 5001, a housing 5002, a display portion 5003, a display portion 5004, a microphone 5005, speakers 5006, operation keys 5007, a stylus 5008, and the like. The display device according to one embodiment of the present invention can be used for the display portion 5003 or the display portion 5004. By using the display device according to one embodiment of the present invention for the display portion 5003 or the display portion 5004, it is possible to provide a highly convenient portable game console capable of displaying 3D images. Although the portable game console in FIG. 12A has the two display portions 5003 and 5004, the number of display portions included in a portable game console is not limited thereto.

Figure 12B:
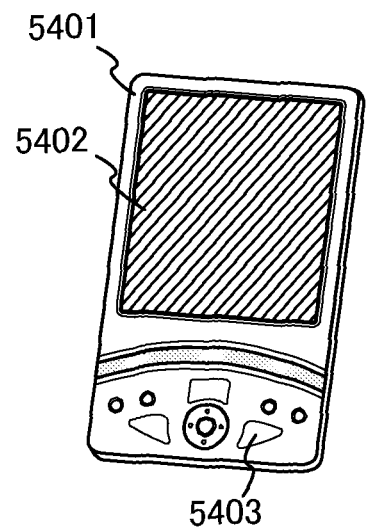

FIG. 12B illustrates a personal digital assistant including a housing 5401, a display portion 5402, operation keys 5403, and the like. The display device according to one embodiment of the present invention can be used for the display portion 5402. By using the display device according to one embodiment of the present invention for the display portion 5402, it is possible to provide a highly convenient personal digital assistant capable of displaying 3D images.

This application is based on Japanese Patent Application serial no. 2011-157990 filed with Japan Patent Office on Jul. 19, 2011, the entire contents of which are hereby incorporated by reference.

What is claimed is:

1. A display device comprising:
a display panel including a plurality of pixels;
a shutter panel including a driver circuit, a liquid crystal, and light-transmitting electrodes provided in a striped manner; and
a positional data detector configured to detect a positional data of a viewer,
wherein the shutter panel is provided over a display surface side of the display panel,
wherein a width of one of the light-transmitting electrodes is smaller than that of one of the plurality of pixels,
wherein the driver circuit is configured to selectively output signals for forming a parallax barrier to the light-transmitting electrodes,
wherein the parallax barrier is capable of changing its shape in accordance with the detected positional data,
wherein the shutter panel further comprises an electrode,
wherein the liquid crystal is interposed between the light-transmitting electrodes and the electrode,
wherein the positional data detector comprises a first ultrasonic wave receiver and a second ultrasonic wave receiver, and an ultrasonic wave transmitter between the first ultrasonic wave receiver and the second ultrasonic wave receiver, so that the positional data detector recognizes an angle and a distance between the display device and the viewer, and
wherein the shutter panel further comprises transistors each including an oxide semiconductor layer served as a channel.

2. The display device according to claim 1,
wherein the plurality of pixels includes first pixels in a first column and second pixels in a second column,
wherein the first pixels are configured to perform a first display for a left eye of the viewer, and
wherein the second pixels are configured to perform a second display for a right eye of the viewer.

3. The display device according to claim 1, wherein the positional data detector utilizes an ultrasonic wave as a detecting medium.

4. The display device according to claim 1,
wherein one of the transistors is located between the driver circuit and one of the light-transmitting electrodes.

5. A display device comprising:
a display panel including a plurality of pixels arranged in matrix, the plurality of pixels including first pixels and second pixels;

a shutter panel including a liquid crystal and light-transmitting electrodes provided in a striped manner; and a positional data detector configured to detect a positional data of a viewer, wherein the shutter panel is provided over a display surface side of the display panel, wherein the light-transmitting electrodes are provided to be parallel or substantially parallel with a column of the plurality of pixels arranged in matrix, wherein a width of one of the light-transmitting electrodes is smaller than that of one of the plurality of pixels, wherein the shutter panel is configured to form a parallax barrier;

wherein a shape of the parallax barrier is determined on the basis of the detected positional data when the first pixels in a first column perform a first display for a left eye of the viewer and the second pixels in a second column perform a second display for a right eye of the viewer, wherein the shutter panel further comprises an electrode, wherein the liquid crystal is interposed between the light-transmitting electrodes and the electrode, wherein the positional data detector comprises a first ultrasonic wave receiver and a second ultrasonic wave receiver, and an ultrasonic wave transmitter between the first ultrasonic wave receiver and the second ultrasonic wave receiver, so that the positional data detector recognizes an angle and a distance between the display device and the viewer, and wherein the shutter panel further comprises transistors each including an oxide semiconductor layer served as a channel.

6. The display device according to claim 5, wherein the positional data detector utilizes an ultrasonic wave as a detecting medium.

7. The display device according to claim 5, wherein the shutter panel further comprises a driver circuit configured to selectively output signals for forming the parallax barrier to the light-transmitting electrodes.

8. The display device according to claim 7, wherein one of the transistors is located between the driver circuit and one of the light-transmitting electrodes.

9. A display device comprising:

a display panel including a plurality of pixels;

a shutter panel including a driver circuit, a liquid crystal, and light-transmitting electrodes provided in a striped manner; and a positional data detector configured to detect a positional data of a viewer, wherein the shutter panel is provided over a display surface side of the display panel, wherein a width of one of the light-transmitting electrodes is smaller than that of one of the plurality of pixels, wherein the driver circuit is configured to selectively output signals for forming a parallax barrier to the light-transmitting electrodes, wherein the parallax barrier is capable of changing its shape in accordance with the detected positional data, wherein the positional data detector comprises a first ultrasonic wave receiver and a second ultrasonic wave receiver, and an ultrasonic wave transmitter between the first ultrasonic wave receiver and the second ultrasonic wave receiver, so that the positional data detector recognizes an angle and a distance between the display device and the viewer, and wherein the shutter panel further comprises transistors each including an oxide semiconductor layer served as a channel.

10. The display device according to claim 9, wherein the plurality of pixels includes first pixels in a first column and second pixels in a second column, wherein the first pixels are configured to perform a first display for a left eye of the viewer, and wherein the second pixels are configured to perform a second display for a right eye of the viewer.

11. The display device according to claim 9, wherein the positional data detector utilizes an ultrasonic wave as a detecting medium.

12. The display device according to claim 9, wherein one of the transistors is located between the driver circuit and one of the light-transmitting electrodes.

* * * * *